United States Patent
Carter, IV (12)

(10) Patent No.: US 6,282,236 B1
(45) Date of Patent: *Aug. 28, 2001

(54) MODEM DESIGNS, AND SYSTEMS USING THE MODEM DESIGNS FOR COMMUNICATING INFORMATION BETWEEN A NUMBER OF REMOTE LOCATIONS AND ONE OR MORE CENTRAL LOCATIONS

(75) Inventor: Thomas Lynn Carter, IV, Greensboro, NC (US)

(73) Assignee: Lucent Technologies, Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/826,630

(22) Filed: Apr. 3, 1997

(51) Int. Cl.[7] ...................................................... H04B 1/38
(52) U.S. Cl. .......................... 375/222; 375/295; 375/303; 375/308; 455/86
(58) Field of Search ................................... 375/222, 297, 375/303, 279, 295, 298, 219, 308; 455/86

(56) References Cited

U.S. PATENT DOCUMENTS

| | | | | |
|---|---|---|---|---|
| 4,317,220 | * | 2/1982 | Martin | 455/58 |
| 4,349,919 | * | 9/1982 | Richardson | 455/86 |
| 5,535,247 | * | 7/1996 | Gailus et al. | 375/297 |
| 5,898,907 | * | 4/1999 | Maruyama | 455/86 |
| 5,982,645 | * | 11/1999 | Levran et al. | 363/37 |
| 5,983,081 | * | 11/1999 | Lehtinen | 455/86 |

* cited by examiner

Primary Examiner—Temesghen Ghebretinsae
(74) Attorney, Agent, or Firm—Morgan & Finnegan, LLP

(57) ABSTRACT

Various modem designs are described, along with systems that use the modem designs for communicating data between a large number of remote locations and one or more central locations preferably over CATV. One aspect features a modem having a transmitter which uses a state machine and digital waveform signals stored in a memory to create a modulated signal. Another aspect features a modem having a receiver which uses a digital correlator including an SRAM for detecting a bipolar phase shift keyed signal. Still another aspect features a modem comprising an oscillator circuit having a feedback loop, wherein the feedback loop utilizes a downlink signal, and a protection circuit which prevents a malfunction in the modem from causing system-wide shutdown.

27 Claims, 4 Drawing Sheets

MODEM DESIGNS, AND SYSTEMS USING THE MODEM DESIGNS FOR COMMUNICATING INFORMATION BETWEEN A NUMBER OF REMOTE LOCATIONS AND ONE OR MORE CENTRAL LOCATIONS

FIELD OF THE INVENTION

The present invention relates the field of data transmission, and in particular to modems that reduce the cost and/or complexity of data transmission and a system using the improved modems.

BACKGROUND OF THE INVENTION

The development and evolution of communications equipment in recent years has altered the manner in which business is conducted. Functions previously performed manually, such as the collection and processing of data, are now performed automatically using computers and sophisticated communications equipment. As the ability to transmit and receive data reliably, efficiently and over long distances has become more and more a part of everyday business, the need for cost efficient communications equipment, and in particular modems, has increased greatly.

For example, such a need is readily apparent in circumstances where data is collected at a number of remote locations and is subsequently transmitted to a central location for processing. In such a situation, it is often necessary to install hundreds or even thousands of modems at the remote locations. Because prior art modems are typically not designed to optimize total system cost savings and, as a result, often incorporate expensive components, the need for such a large number of modems can make the cost of any such system prohibitive. Thus, it has become increasingly important to provide low cost modems that are tailored to a specific task.

SUMMARY OF THE INVENTION

The present invention features modems that reduce the costs and/or complexity of data transmission and a system using the improved modems. For example, the system can gather and transmit data from a large number of remote locations back to one or more central locations.

In one aspect, the invention features a transmitter which converts a data stream into a modulated signal including a memory for storing a plurality of digital waveform signals, a state machine for receiving the data stream, and for choosing an appropriate one of the digital waveform signals based upon the data stream and a digital-to-analog converter for converting the digital waveform signal into an analog signal. In the transmitter, the modulated signal can be represented as a sequence of possible transitions wherein each of the digital waveform signals is a particular one of the possible transitions. In preferred embodiments, the modulated signal is a bipolar coded frequency shift keyed signal and the state machine chooses the appropriate digital waveform signals according to a set of rules for bipolar coding.

In another aspect, the invention features a receiver which converts a differential bipolar phase shift keyed signal into an output data stream including a sampling circuit for sampling the differential bipolar phase shift keyed signal at a predetermined sampling rate, a serial to parallel converter for converting the sampled signal into a plurality of parallel signals, a counter for cycling the parallel signals through a predetermined number of memory locations of a memory, a parallel to serial converter for converting the plurality of parallel signals into a serial signal, and an exclusive OR gate which takes as inputs the sampled signal and the serial signal and outputs a data stream.

In a preferred embodiment, the receiver further includes at least one shift register coupled to the parallel to serial converter. Also, in other preferred embodiments, the parallel signals are cycled through the memory locations at a predetermined cycling rate that is equal to the predetermined sampling rate divided by the number of parallel signals, and the number of memory locations is chosen such that a time elapsed in cycling the parallel signals through the memory locations and receiving the serial signal in the shift register and subsequently outputting the serial signal is equal to a time corresponding to one data bit of the differential bipolar phase shift key to signal.

In still another aspect, the invention features a method of converting a data stream into a modulated signal including the steps of storing a plurality of digital waveform signals, choosing an appropriate one of the digital waveform signals based upon the data stream, and converting the appropriate one of the digital waveform signals into an analog signal. In this method, the modulated signal can be represented as a sequence of possible transitions and each digital waveform signal is a particular one of the possible transitions. In preferred embodiments of the method, the modulated signal is a bipolar, coded frequency shift keyed signal and the appropriate one of the digital waveform signals is chosen according to a set of rules for bipolar coding.

In yet another aspect, the invention features a method of converting a differential bipolar phase shift keyed signal into an output data stream, including the steps of sampling the differential bipolar phase shift keyed signal at a predetermined sampling rate, converting the sampled the signal into a plurality of parallel signals, cycling the parallel signals through a predetermined number of memory locations, converting the parallel signals into a serial signal, and inputting the sampled signal and the serial signal into an exclusive OR gate wherein a data stream is output by the exclusive OR gate. In a preferred embodiment, the method includes cycling the serial signal through at least one shift register after the step of converting the parallel signals into a serial signal. In other preferred embodiments, the parallel signals are cycled through the memory locations at a cycling rate that is equal to the predetermined sampling rate divided by the number of parallel signals and the number of memory locations is chosen such that a time elapsed in cycling the parallel signals through the memory locations and the shift register is equal to a time corresponding to one data bit of the differential bipolar phase shift keyed signal.

In yet a further aspect, the invention features a modem including modulator circuitry for modulating an input data stream with a carrier signal generated by an oscillator circuit, an amplifier for amplifying the modulated signal and outputting a second modulated signal, and a protection circuit coupled to the amplifier and the oscillator circuit having a timer triggered by receipt of the monitor signal. The amplifier outputs a monitor signal when the amplifier is outputting the second modulated signal and the protection circuit outputs first and second signals when the amplifier outputs the monitor signal for a time longer than the duration of the timer. The first signal disables the amplifier and the second signal disables the oscillator circuit. In preferred embodiments, a differential bipolar phase shift keyed modulation scheme is used to modulate the input data and the modulator circuitry comprises a BPSK based and generator coupled to a double balanced modulator.

In still another aspect, the invention features a modem including an oscillator circuit for producing a carrier signal and modulator circuitry for modulating an input data stream with the carrier signal. The oscillator circuit includes a frequency synthesizer coupled to a voltage controlled oscillator and a divide by two circuit coupled to the voltage controlled oscillator. The voltage controlled oscillator outputs a second carrier signal which is input into the divide by two circuit. The carrier signal is output by the divide by two signal. In preferred embodiments, the frequency synthesizer uses a frequency reference provided by a voltage controlled crystal oscillator and the modem further includes a receiver which receives a downlink signal, wherein the downlink signal is used in a feedback loop as an input into the voltage controlled crystal oscillator.

In another aspect, the invention features a modem including an oscillator circuit for producing a mixing signal, a mixer for mixing the mixing signal with the modulated signal, and a detector for converting the mixed modulated signal into a data stream. The oscillator circuit comprises a frequency synthesizer coupled to a voltage controlled oscillator, wherein the frequency synthesizer uses a frequency reference and wherein the frequency reference is provided by a voltage controlled crystal oscillator. Also, the data stream output by the detector is input into the voltage controlled crystal oscillator to create a feedback loop. In a preferred embodiment, the modulated signal is a bipolar coded frequency shift keyed signal.

Finally, in still further aspects, the invention features various systems for communicating data between a plurality of remote locations and a central location which utilize the various aspects of the invention described above.

DETAILED DESCRIPTION OF THE PREFERRED EMBODIMENTS

In the preferred embodiment, the invention is implemented in a system that gathers data at a large number of customer premises and transmits the gathered data to a central location. In particular, the Integrated Broadband Utility System, or IBUS, developed by Lucent Technologies Inc. provides a system through which utility companies can remotely communicate with, monitor and control devices in the field such as electric or gas meters, thermostats, air conditioners and other appliances located at a customers premises. For example, the IBUS allows a utility company to obtain data from the field, such as meter readings, and to perform functions such as load profiling. Also, a utility company can control the operation of devices in the field and, as such, the IBUS permits the utility to remotely perform load control functions.

Figure 1:
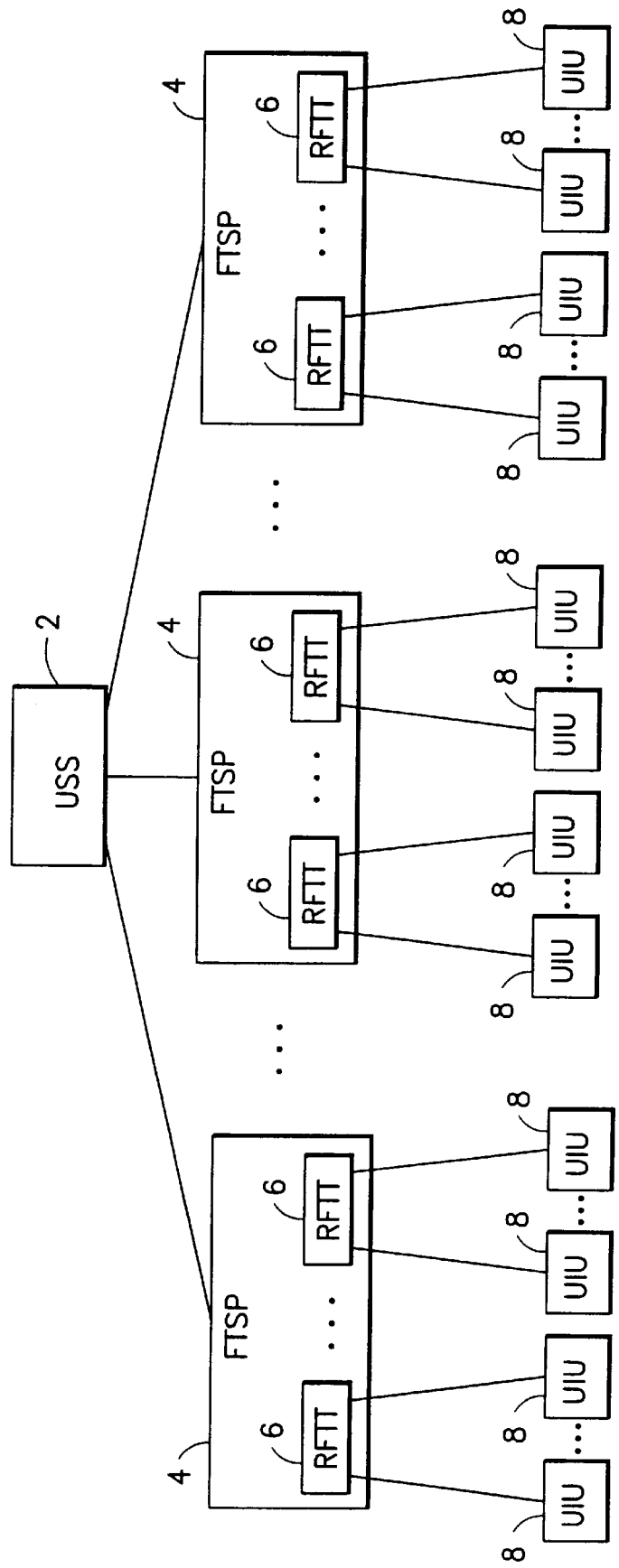
FIG. 1 is a block diagram of the Integrated Broadband Utility System according to an aspect of the present invention.

As shown in FIG. 1, the IBUS has a tree structure. At the top of the tree at the utility company office is Utility System Server 2, also known as a USS. The USS 2, which covers the entire utility company service area, includes a central computer that gathers data and controls the various operations of the IBUS. The communications network used by the IBUS is a Hybrid Fiber Coax, or HFC, network which is preferably an existing cable television, or CATV, network. In communication with the USS 2 are several Fault Tolerant Signal Processors 4, also known as an FTSP, scattered over the utility company's service area. Each FTSP 4 is located at a CATV head end and has contained within it up to ten RF Trunk Terminators 6, also known as an RFTT. Each RFTT 6 has two boards, a CPU board which contains a processor and a HDLC chip for controlling the RFTT 6 and communicating up the tree with the FTSP4 and USS2, and a modem board for communicating down the tree with devices to be described below. Connected to each RFTT 6 are up to 2000 Utility Interface Units 8, also known as a UIU. The UIUs 8 are deployed in the field at the customer premises and communicate with the various devices (not shown), such as gas and electric meters, located at the customer premises. Each UIU 8 and a corresponding RFTT 6 communicate through a two-way data link. In particular, each UIU 8 includes a modem board having a transmit section and a receive section which communicates with the modem board of a corresponding RFTT 6. The modem board of the RFTT 6 similarly includes an uplink receiver and a downlink transmitter. The UIU 8 modem and the RFTT modem board will be described in more detail below.

Two way communication in an HFC network such as CATV network is accomplished by band-splitting the system into forward, or downlink, and reverse, or uplink, paths. Typically, frequencies of 50 MHz and up are used for the forward path from the CATV head end to the customer premises, and frequencies of 40 MHz and below are used for the reverse path in the opposite direction.

Because there are up to 2,000 UIUs 8 for every RFTT 6 in the IBUS, the design of the UIU 8 is much more cost sensitive than the design of the RFTT 6. As a result, the UIU 8 is designed to minimize cost by using components which are already in high volume production for other applications and to eliminate features wherever possible. However, each design decision made with respect to the UIU 8 impacts the design of the RFTT 6 because the UIU 8 and the RFTT 6 must be compatible.

Figure 2:
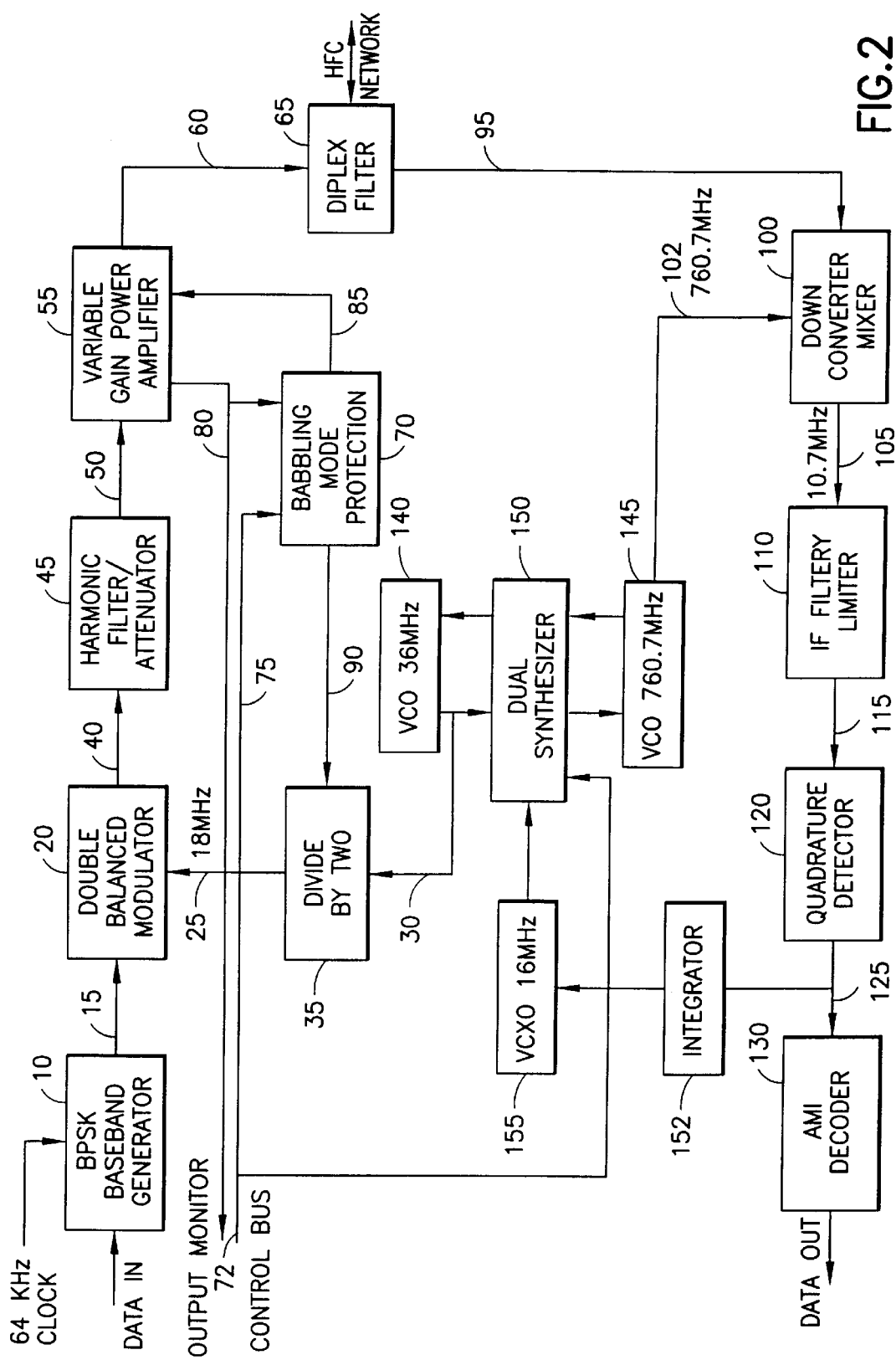
FIG. 2 is a block diagram of the UIU modem board according to an aspect of the present invention.

Referring to FIG. 2, a block diagram of the UIU modem board is shown. Differential bipolar phase shift keying, or BPSK, is used as the uplink modulation scheme for the IBUS from the UIU 8 to the RFTT 6. In differential BPSK, a signal having a phase transition of 180° corresponds to a logic high signal, or a logic 1, and a signal having no phase transition corresponds to a logic low signal, or a logic 0. Thus, in differential BPSK, if the phase of the received signal is the same as it was one bit ago, the transmitted signal was a logic 0, and if the phase of the received signal is the opposite of what it was one bit ago, the transmitted signal was a logic 1.

In order to produce a differential BPSK signal corresponding to a digital data signal collected by the UIU 8, such as a meter reading, the digital data signal is input into BPSK baseband generator 10 preferably at a rate of 64 KBPS, as shown in FIG. 2. BPSK baseband generator 10 includes a J-K flip-flop in which the J and K inputs are connected together. Thus, if a logic 1 is input into the J-K flip-flop, the output will change states, and if a logic 0 is input into the J-K flip-flop, the output will not change states.

As shown in FIG. 2, the baseband signal 15 output by the BPSK baseband generator 10 is fed into double balanced modulator 20, to be described below. To create the baseband signal 15 suitable for input into the double balanced modulator 20, the bit stream output by the J-K flip-flop must be conditioned. Thus, BPSK baseband generator 10 is also provided with level shifting and low pass filtering circuitry and circuitry for converting the signal to a differential voltage signal, all of which are well known in the art. The level shifting circuitry converts the bit stream output by the J-K flip-flop to a level that can be utilized by the double balanced modulator 20, i.e., millivolts, and the low pass filtering circuitry "rounds off" the edges of the bit stream so that the signal produced by double balanced modulator 20 will be band limited.

As stated above, the baseband signal 15 is input into double balanced modulator 20 which modulates a carrier signal 25 with the baseband signal 15. Preferably, the carrier signal 25 is an 18 MHz signal. The double balanced modulator 20, also known as Gilbert Cell, is well known in the art, an example of which is the Philips SA 602.

The baseband signal 15 is linear and the carrier signal 25 is hard limited, the result being that images of the intended signal occur at harmonics of the carrier signal 25. These harmonics must be suppressed to avoid causing out-of-band interference. To suppress the even harmonics, the carrier signal 25 is produced by dividing the frequency of a carrier source signal 30, which is at twice the carrier frequency, by two using a divide by two circuit 35 comprising a T flip-flop. The divide by two method assures a 50% duty cycle, which has very low even harmonic content. The carrier source signal 30 itself is produced in a manner to be described in detail below.

Thus, in the frequency domain, the signal 40 output by the double balanced modulator 20 comprises a replica of the baseband signal 15 at the carrier frequency and at all of the odd harmonics of the carrier frequency. The signal 40 is input into harmonic filter/attenuator 45, which includes an LC filter, in order to eliminate the odd harmonics. Because the even harmonics were already eliminated from signal 40 as described above, a cheaper, less complex LC filter can be used. Harmonic filter/attenuator 45 also includes an attenuator circuit, which is well known in the art, for changing the level of signal 40 to a level suitable for variable gain power amplifier 55. Thus, signal 50 output by harmonic filter/attenuator 45 is a modulated signal at the carrier frequency.

HFC networks are generally very lossy. Thus, before being transmitted over the HFC network, signal 50, which when output by harmonic filter/attenuator 45 is in millivolts, must be amplified. In addition, the amount of amplification necessary varies greatly within the HFC network. Thus, signal 50 is passed through variable gain power amplifier 55 to produce an amplified signal 60. Variable gain power amplifiers are well known in the art, an example of which is the Lucent V4910. Also, included within the variable gain power amplifier 55 is a transformer which matches the impedance of the variable gain power amplifier 55 to the impedance of the HFC network, which is typically 75 ohms.

The signal 60 is then input into diplex filter 65, which comprises a crossover network. Diplex filter 65 permits low frequencies, e.g., 40 MHz and below, to pass out into the HFC network, and permits high frequencies, e.g., 50 MHz and above, to come in from the network. Thus, diplex filter 65 routes signal 60 out into the HFC network and routes higher frequency signals coming in from the HFC network to down converter mixer 100. In addition, diplex filter 65 isolates down converter mixer 100 from variable gain power amplifier 55.

The IBUS is set up such that only a single UIU 8 is permitted to transmit information at a time. Thus, if any one of the UIUs 8 gets stuck in the transmit mode due to a malfunction, the entire system will be disabled. Accordingly, a limit is placed on the amount of time that any one UIU 8 can transmit information.

In particular, the above described limit is implemented as follows. A control signal 75 sent from the CPU section (not shown) of the UIU 8 via control bus 72 and an output monitor signal 80 output by the variable gain power amplifier 55 are input into babbling node protection circuit 70. Control signal 75 goes high when the UIU 8 is supposed to be transmitting data and the output monitor signal 80 goes high when variable gain power amplifier 55 is actually transmitting data.

In addition, babbling node protection circuit 70 outputs enable signals 85 and 90 which are input into variable gain power amplifier 55 and divide by two circuit 35, respectfully. Variable gain power amplifier 55 and divide by two circuit 35 are disabled until each receives the respective enable signal 85 or 90. Babbling node protection circuit 70 is designed so that enable signals 85 and 90 go high in response to control signal 75 going high. Thus, variable gain power amplifier 55 and divide by two circuit 35 are enabled when control signal 75 goes high, i.e., the UIU 8 is supposed to be transmitting data. In addition, a timer, in the form of an RC charging circuit, contained within babbling node protection circuit 70 is triggered as soon as the output monitor signal 80 goes high, i.e., as soon as variable gain power amplifier 55 actually begins transmitting. The RC charging circuit has a charging period equal to a predetermined permissible transmit time for the UIU 8. If the output monitor signal 80 is still in a high state when the predetermined time elapses, i.e., when the RC circuit fully charges, then the babbling node protection circuit 70 causes enable signals 85 and 90 to go low, thereby disabling variable gain power amplifier 55 and divide by two circuit 35 and shutting down the transmitter. Thus, the babbling node protection circuit 70 prevents the entire IBUS system from being disabled due to a malfunctioning variable gain power amplifier 55 in any one UIU 8 by only permitting the UIU 8 to transmit for only a predetermined amount time.

Also, by providing both enable signal 85 and enable signal 90 to control transmission of data at the variable gain power amplifier 55 and the divide by two circuit 35, respectively, the babbling node protection circuit 70 is provided with a redundancy that protects against a single point failure in the form of a short in the lines that provide the enable signals 85 and 90. In other words, for a single point failure as just described to cause a particular UIU 8 to be stuck in transmit mode and thus cause the entire IBUS system to be disabled, both lines must fail simultaneously, which is unlikely.

Still referring to FIG. 2, the receive section of the UIU modem will now be described. An RF signal 95, preferably a 750 MHz signal, sent from a corresponding RFTT 6 is routed, as described above, by diplex filter 65 to down converter mixer 100. The down converter mixer 100 amplifies RF signal 95 and mixes it down to preferably a 10.7 MHz signal 105 using 760.7 MHz mixing signal 102. The down converter mixer 100 also outputs any signal present at 771.4 MHz which is the image frequency of the two signals. The image frequency is chosen to be out of band in the CATV system. Down converter mixers are well known in the art, an example of which is the Philips SA 621 chip, a part intended for use in cellular phone applications. The mix down frequency is preferably 10.7 MHz because that is a standard intermediate frequency used for FM radio. Thus, standard FM radio parts can be used to process and demodulate the RF signal 95 sent from the RFTT 6. The RFTT to UIU frequency is chosen to be in the top 20 MHz of the CATV system's forward path so as to eliminate the need for an expensive image reject filter or a dual conversion receiver.

The 10.7 MHz signal 105 is then passed through IF filter/limiter 110 which "squares" the signal off and eliminates out of band components thereof. The filter/limiter 110 is made up of a ceramic FM radio IF filter and a limiter chip such as the Philips SA 604, both of which are common and well known in the art.

Frequency shift keying, or FSK, with a deviation or offset of ±64 KHz is the preferred modulation technique for the downlink signal sent from the RFTT 6 to the UIU 8. It should be understood, however, that other deviation frequencies can be used without deviating from the scope of the invention described herein. Frequency shift keying is well known in the art and will not be described in detail herein. In addition, bipolar coding, also known as alternate mark inversion, or AMI, is used in the preferred modulation scheme. In bipolar coding, a logic 0 is encoded with a zero voltage while a logic 1 is alteratively encoded with positive and negative voltages. Hence, the average voltage level is maintained at zero, thereby eliminating dc components of the baseband signal. Thus, when the signal is modulated at the RFTT 6, a logic 0 is sent at the carrier frequency while logic 1s are alternatively sent at the carrier frequency plus 64 KHz and carrier frequency minus 64 KHz. Accordingly, signal 115 output by the IF filter/limiter is a bipolar coded FSK signal centered at 10.7 MHz. The signal 115 must be demodulated in order to retrieve the transmitted digital data.

The signal 115 is sent through quadrature detector 120 which outputs a signal 125 having a zero voltage if signal 115 is at the carrier frequency of 10.7 MHz, a positive voltage if signal 115 is at the carrier frequency plus the offset frequency, and a negative voltage if signal 115 is at the carrier frequency minus the offset frequency. The signal 125 is then input into AMI decoder 130 which converts signal 125, which is a bipolar coded signal, into a signal wherein a logic 1 is represented only by a positive voltage signal rather than by alternating positive and negative voltages. AMI decoder 130 is well known in the art and consists of a group of three comparators with open collector outputs. Two comparators detect the positive and negative voltage components of signal 125. The third comparator is used to implement an OR gate by wire-OR combining the outputs of the other two comparators. The output 135 of the AMI decoder 130 is a logic level bit stream representing the data transmitted by the RFTT 6 which is suitable for processing by the CPU section (not shown) of the UIU 8.

As described above, the transmit and receive sections of the UIU modem each require an accurate local oscillator to function. The transmit section oscillator frequency, embodied in carrier source signal 30, is preferably 36 MHz. As described above, carrier source signal 30 is divided in half by divide by two circuit 35 to produce carrier signal 25. The receive section oscillator frequency, embodied in mixing signal 102, is preferably 760.7 MHz. The transmit section oscillator could be implemented with a crystal oscillator but the receive section oscillator frequency is too high for a crystal oscillator. Instead, a frequency synthesizer is used to control voltage controlled oscillator 140, which provides carrier source signal 30, and a second frequency synthesizer is used to control voltage controlled oscillator 145, which provides mixing signal 102. The two frequency synthesizers 140 and 145 are provided on dual synthesizer chip 150, an example of which is the Philips UMA 1018.

Frequency synthesizers are well known in the art and consist of two digital dividers and a phase locked loop. In operation, the frequency synthesizer is programmable such that the frequency of a voltage controlled oscillator is divided by a value N and a reference frequency is divided by a value R. The two divided frequencies are fed into a phase detector whose output is filtered and fed back into the voltage controlled oscillator, forming a phase locked loop. The voltage controlled oscillator will be driven to a frequency of N/R times the reference frequency. Thus, the reference frequency and N and R are chosen in the preferred embodiment of the present invention such that voltage controlled oscillator 140 is driven to 36 MHz and voltage controlled oscillator 145 is driven to 760.7 MHz.

As stated above, the frequency synthesizers require a frequency reference. Due to the scaling function of a frequency synthesizer, the ppm error of the frequency reference becomes the ppm error of the voltage controlled oscillator. At high frequencies, a small ppm error can cause a large absolute frequency error. In order to achieve a suitable accuracy, preferably ±10 KHz, the frequency reference must be accurate to 13 ppm. An uncompensated crystal oscillator typically has ±150 ppm total error over a temperature range of −40° C. to +85° C. and is thus not acceptable. The conventional approach used in cellular applications is to use a temperature controlled crystal oscillator. However, temperature controlled crystal oscillators are very expensive and would drive up the price of the UIU 8 significantly.

Instead, in the present invention, a voltage controlled crystal oscillator 155 and a feedback loop utilizing the downlink signal from the RFTT 6 is used to provide the frequency reference. In particular, any error in mixing signal 102 will cause signal 105 to have a frequency error, i.e., signal 95 will be mixed down to something other than 10.7 MHz. Such a frequency error will show up as a DC offset at the output of quadrature detector 120. This DC offset is integrated by an integrator circuit 152 to provide an error signal constituting a correction voltage that is driven into voltage controlled crystal oscillator 155 to form a feedback loop. As a result, the DC offset will be driven to zero and the system will converge on the correct frequencies.

Figure 3:
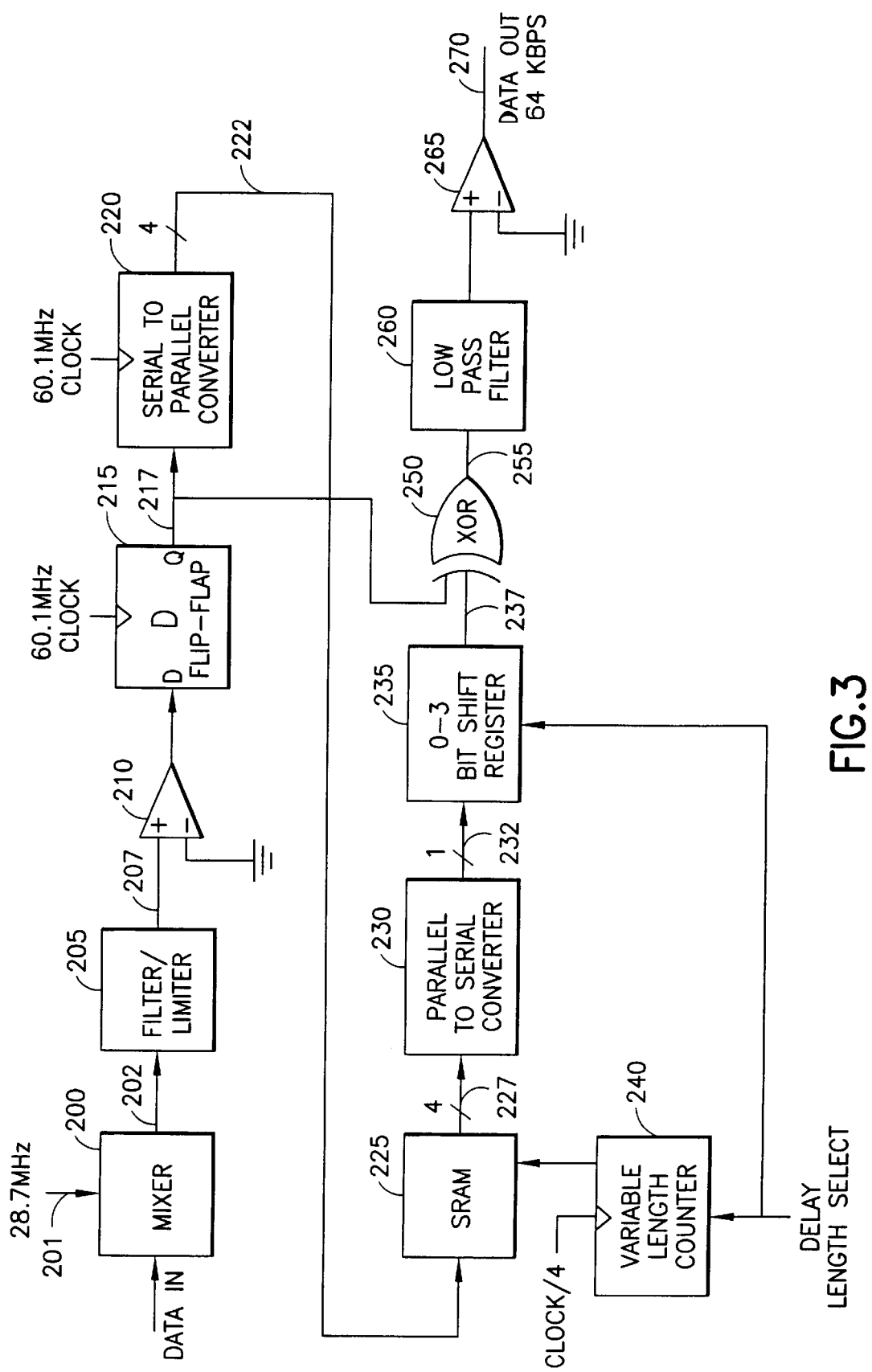
FIG. 3 is a block diagram of the uplink receiver of the RFTT modem board according to an aspect of the present invention.

Referring to FIG. 3, a block diagram of the uplink receiver of the RFTT modem board is shown. As shown in FIG. 3, the 18 MHz differential BPSK signal received from a transmitting UIU 8 is input into mixer 200 and is mixed with 28.7 MHz to yield signal 202 which includes a 10.7 MHz IF frequency signal and a 46.7 MHz signal. Filter/limiter 205 then filters and limits the signal 202 output by mixer 200 to eliminate the out of band signals, thereby producing 10.7 MHz limited differential BPSK signal 207.

Next, differential BPSK signal 207 must be demodulated, also known as detection, in order recover the original data that was transmitted by the UIU 8. In general, there are two methods of differential BPSK detection. Synchronous phase detection uses a phase locked loop or similar circuit to generate a local phase reference at the receiver. Asynchronous phase detection, on the other hand, does not use a local phase reference, but instead uses a delayed version of the signal itself as a phase reference. This method of detection utilizes what is commonly known as an auto-correlator circuit consisting of a delay line and a phase comparator. In such an auto-correlator circuit, the differential BPSK signal is fed through a delay line which is one data bit long, or approximately 15.6 μs for a 64 KBPS system. The direct differential BPSK signal and the delayed differential BPSK signal are then fed into a phase detector. If the phase has changed from one bit to the next, the signals will be 180° out of phase. If the phase has not changed from one bit to the next, the signals will be in phase. The originally transmitted signal is pre-conditioned such that a phase transition represents one logic level, e.g., a logic 1, and no phase transition represents the other logic level, e.g., a logic 0. Accordingly, the phase detector output will represent the originally transmitted data without polar ambiguity.

The conventional implementation of such an auto-correlator utilizes an analog delay line and a mixer. At high baud rates, a surface acoustic wave, or SAW, delay line can be used. However, for the 64 KBPS used in the preferred embodiment of present invention, the necessary delay is approximately 15.6 µs and would require a SAW crystal over three inches long. Such a delay line would be impractical and very expensive.

Instead, as shown in FIG. 3, the present invention uses a digital correlator. A digital correlator will provide the required delay time and precision using inexpensive components. The 10.7 MHz differential BPSK signal 207 is sampled at a clock rate of preferably 60.1 MHz using a comparator 210 and a D flip-flop 215. The 60.1 MHz sampling rate is preferable so as to randomize errors due to sampling metastability. The comparator 210 converts the differential BPSK signal 207 to a logic level signal appropriate for subsequent components and the D flip-flop clocks the samples through at the preferred 60.1 MHz clock rate.

Next, the signal 217 output by the D flip-flop 215 is passed through a digital delay including serial to parallel converter 220, SRAM 225, parallel to several converter 230 and 0–3 bit shift register 235. The general idea behind the digital delay is that a one bit delay is created by cycling the sample bit stream through the memory locations of an SRAM for a period corresponding to one data bit.

Inexpensive SRAMs, however, are not fast enough to handle a 60.1 MHz sample bit stream directly. Instead, as shown in FIG. 3, serial to parallel converter 220 is used to convert the 60.1 MHz sampled bit stream signal 217 into preferably four parallel bit streams 222. The parallel bit streams are then cycled through the memory locations of four bit wide SRAM 225 at a rate of approximately 15 MHz, or the clock rate divided by four, by variable length counter 240. Next, the parallel bit stream signal 227 output by SRAM 225 is passed through parallel to serial converter 230 in order to convert the parallel bit stream signal 227 back into a serial bit stream 232. The SRAM 225 and the variable length counter 240 thus provide a variable delay with a resolution of four bits. Consequently, 0–3 bit shift register 235 is used to provide full one bit resolution.

The number of memory locations in SRAM 225 needed to provide the appropriate delay can be readily calculated and, based on this calculation, the length of variable counter 240 and the number of shift registers in 0–3 bit shift register 235 utilized can be selected. Such a selection is made through a ten bit delay length select signal, 8 bits of which go to variable length counter 240 and 2 bits of which go to 0–3 bit shift register 235. The end result is that the direct sampled bit stream represented by signal 217 and a delayed sampled bit stream 237, delayed by one data bit, are input into exclusive OR gate 250 which acts as a phase comparator. The output of exclusive OR gate 250 will be a bit stream which is mostly either 1s or 0s depending on the phase relationship of the originally transmitted signal and will thus correspond to the transmitted data. As long as any errors occur randomly and not in bursts, they can be treated as random noise and most of their energy will be out of band. The 64 KBPS data originally transmitted is recovered from the 60.1 MHz bit stream signal 255 output by the exclusive OR gate 250 by a low pass filter 260 followed by a comparator 265. The low pass filter 260 removes out of band noise and the comparator 265 produces a 64 KBPS data bit stream 270 with standard logic levels. The 64 KBPS data bit stream is sent to the CPU board (not shown) of the RFTT 6, which in turn sends the appropriate data up to the USS 2 through the FTSP 4.

Figure 4:
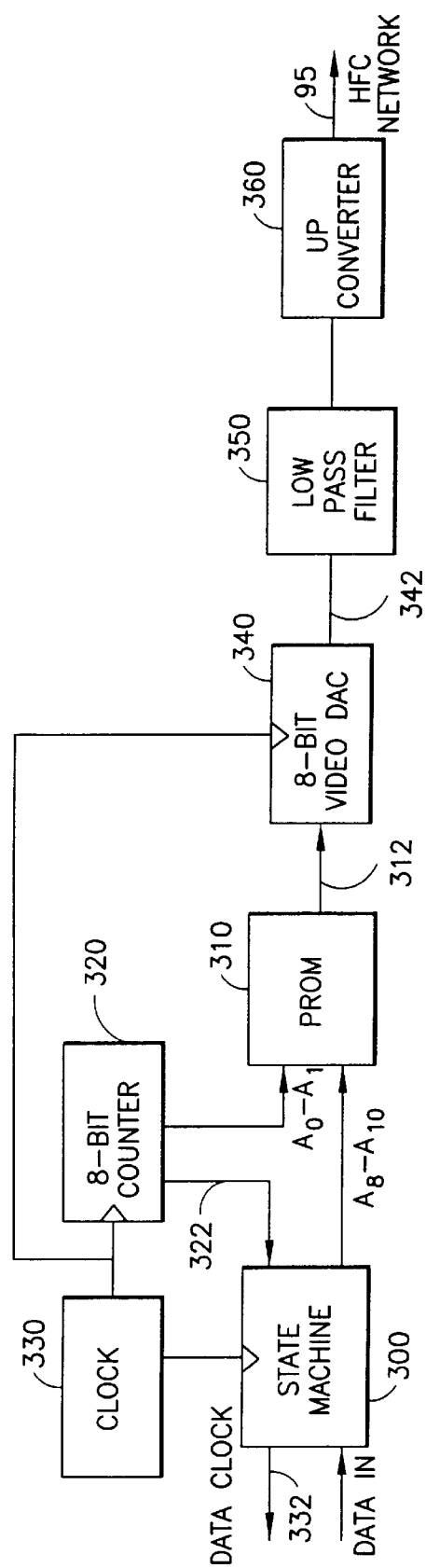
FIG. 4 is a block diagram of the downlink transmitter of the RFTT modem board according to an aspect of the present invention.

Referring to FIG. 4, a block diagram of the downlink transmitter of the RFTT modem board is shown. As described above, the RFTT modem board transmits a continuous downlink signal which is received by all of the UIUs 8 connected to the RFTT 6. Also as described above, the downlink signal is preferably a 750 MHz carrier modulated with bipolar coded FSK, which means that a logic 0 always corresponds to a null frequency deviation, and a logic 1 corresponds to a frequency deviation, preferably 64 KHz, in the opposite direction of the most recently transmitted 1. The average frequency of this signal is independent of bit pattern because successive logic 1 deviations cancel each other out. Thus, as described above, the downlink signal can be used as an accurate frequency reference by the UIUs 8.

The downlink bipolar coded FSK signal is generated digitally by the RFTT modem board. In particular, as shown in FIG. 4, data to be transmitted is input from the CPU board (not shown) of the RFTT 6 into a state machine 300. Based on the incoming data, state machine 300 selects appropriate digital recordings of bipolar coded FSK waveforms which are stored in PROM 310. The digital waveform recordings are then strung together and sent to a video DAC 320 which generates the bipolar coded FSK signal that ultimately is transmitted as the downlink signal.

As stated above, the bipolar FSK signal has three states. A logic 0 is always the same and a logic 1 can be either positive or negative. Thus, any bipolar FSK signal can be broken up into a sequence of transitions. These transitions are +1 to −1, +1 to 0, −1 to +1, −1 to 0, 0 to +1, 0 to −1 and 0 to 0. Transitions from +1 to +1 and −1 to −1 are illegal due to the rules of bipolar coding. In the present invention, the data rate is preferably 64 KHz and the frequency deviation is ±64 KHz, so a positive deviation has one extra cycle and a negative deviation has one less cycle. As a result, it is possible to design a set of eight digital waveform recordings which represent all possible transitions and are continuous in phase. The digital waveform recordings are stored at respective address locations in PROM 310.

In addition, the digital waveform recordings can be generated on a PC spreadsheet program and later downloaded to the PROM 310. As a result, the waveforms can be pre-distorted to optimize close-in spectral content, which eliminates the need for close-in filtering.

The sampling rate of the digital waveform recordings is preferably 16.384 MHz and each digital waveform recording is preferably 256 samples in length, each sample being an eight bit word. Thus, each recording has a duration of one data bit. The recordings have a base frequency of preferably 3.2 MHz and deviation frequencies of preferably 3.136 MHz and 3.264 MHz. Each recording starts at the beginning frequency, passes through a transition period where the frequency follows a raised cosine trajectory, and finishes at the end frequency. The starting phase of each recording is chosen so that it matches the ending phase of all the recordings that could have preceded it. The fraction of the waveform that is in the transition period can be varied to trade off sharp transitions versus signal bandwidth. A fraction of 50% transition is preferable.

As stated above, the digital data to be transmitted is input into state machine 300 which, based upon the current data and prior data, chooses the appropriate digital waveform recording stored in the PROM 310 according to the rules of bipolar coding. In particular, state machine 300 outputs a three bit address, $A_8$–$A_{10}$, which indicates the proper memory location in PROM 310 at which the desired digital waveform recording is stored. State machines are well known in the art. In the present invention, state machine 300 comprises three registers, which output the three bit address $A_8$–$A_{10}$, and some control and feedback logic. The control logic is designed such that it chooses the appropriate digital recording using the input data and the rules of bipolar coding.

As previously mentioned, each digital waveform recording comprises 256 eight bit words. Thus, when an appropriate digital waveform recording is chosen from PROM 310 by state machine 300, 8-bit counter 320, which outputs bits $A_0$–$A_7$, is used to clock the 256 eight bit words making up the digital waveform recording out of the PROM 310 as digital waveform signal 312. The carry signal 322 of 8-bit counter 320 is sent to state machine 300 as an indication of when that the digital waveform recording has been completely output by PROM 310. Clock 330 is set at 256 times the data rate and is input into state machine 300, 8-bit counter 320, and 8-bit video DAC 340. A data clock signal 332, which is equal to the clock signal output from clock 330 divided by 256, is generated by state machine 300 and output to the CPU board (not shown) of the RFTT 6 to ensure that the data coming into state machine 300 is synchronous.

Next, digital waveform signal 312 output by PROM 310 is input into 8-bit video DAC 340 which converts digital waveform signal 312 into analog waveform signal 342. The analog waveform signal 342 preferably has a frequency of 3.2 MHz. Analog waveform signal 342 is then passed through low pass filter 350 and up converter 360 which moves the signal to the preferred transmit frequency of 750 MHz, set the appropriate power level, and removes any alias or image frequencies. Ultimately, 750 MHz RF signal 95, described above with respect to FIG. 2, is output to the HFC network where it is received by the UIUs 8.

Although specific frequencies, data rates, sampling rates and similar values have been provided herein in describing the present invention, it is to be understood that such specific values only represent preferred embodiments of the various aspects of the present invention and that other values can be substituted therefor without deviating from the scope of the present invention as defined in the appended claims. Furthermore, although specific modulation schemes, such as bipolar coded frequency shift keying and differential bipolar phase shift keying, have been used in describing the preferred embodiments of the present invention, it should be readily apparent to one of ordinary skill in the art that alternative modulation schemes, such as phase shift keying, quadrature phase shift keying, differential quadrature phase shift keying, frequency shift keying, and others, can be used in the present invention without deviating from the scope thereof as defined in the appended claims.

What is claimed is:

1. A modem, comprising:
    modulator circuitry for modulating an input data stream with a carrier signal to produce a first modulated signal, wherein said carrier signal is generated by an oscillator circuit;
    an amplifier coupled to said modulator circuitry for amplifying said first modulated signal and outputting a second modulated signal, wherein said amplifier outputs a monitor signal when said amplifier is outputting said second modulated signal; and
    a protection circuit coupled to said amplifier and to said oscillator circuit, said protection circuit including a timer having a duration, said timer being triggered by receipt of said monitor signal, wherein said protection circuit outputs first and second signals when said amplifier outputs said monitor signal for a time longer than said duration of said timer, said first signal disabling said amplifier and said second signal disabling said oscillator circuit.

2. A modem according to claim 1, wherein said timer comprises an RC charging circuit.

3. A modem according to claim 1, wherein said protection circuit outputs third and fourth signals upon receipt of a control signal, said third signal enabling said amplifier and said fourth signal enabling said oscillator circuit.

4. A modem according to claim 3, wherein said control signal indicates that said amplifier should be outputting said second modulated signal.

5. A modem according to claim 1, wherein a differential bipolar phase shift keying modulation scheme is used to modulate said input data, said modulator circuitry comprising a BPSK baseband generator coupled to a double balanced modulator.

6. A modem according to claim 1, wherein said oscillator circuit comprises a frequency synthesizer coupled to a voltage controlled oscillator.

7. A modem according to claim 6, wherein said voltage controlled oscillator outputs a second carrier signal, said oscillator circuit further comprising a divide by two circuit coupled to said voltage controlled oscillator, wherein said second carrier signal is input into said divide by two circuit and said carrier signal is output by said divide by two circuit.

8. A modem according to claim 7, wherein a frequency of said carrier signal is equal to one-half of a frequency of said second carrier signal.

9. A modem according to claim 6, wherein said frequency synthesizer uses a frequency reference and wherein said frequency reference is provided by a voltage controlled crystal oscillator.

10. A modem according to claim 9, said modem further comprising a receiver, said receiver receiving a downlink signal, wherein said downlink signal is used in a feedback loop as an input into said voltage controlled crystal oscillator.

11. A modem according to claim 10, said oscillator circuit further comprising a second frequency synthesizer coupled to a second voltage controlled oscillator, said second voltage controlled oscillator using said frequency reference and outputting a mixing signal, said mixing signal being mixed with said downlink signal.

12. A modem, comprising:
    an oscillator circuit for producing a carrier signal,
        said oscillator circuit, comprising
            a frequency synthesizer coupled to
            a voltage controlled oscillator, and
            a divide by two circuit coupled to said voltage controlled oscillator,
                wherein said voltage controlled oscillator outputs a second carrier signal and wherein said second carrier signal is input into said divide by two circuit and said carrier signal is output by said divide by two circuit;

modulator circuitry for modulating an input data stream with said carrier signal to produce a modulated signal; and a protection circuit to permit transmission for only a predetermined time coupled to said divide by two circuit.

13. A modem to claim 12, further comprising an amplifier coupled to said modulator circuitry for amplifying said modulated signal and outputting a second modulated signal.

14. A modem according to claim 12, wherein said frequency synthesizer uses a frequency reference and wherein said frequency reference is provided by a voltage controlled crystal oscillator.

15. A modem according to claim 14, said modem further comprising a receiver, said receiver receiving a downlink signal, wherein said downlink signal is used in a feedback loop as an input into said voltage controlled crystal oscillator.

16. A modem according to claim 15, said oscillator circuit further comprising a second frequency synthesizer coupled to a second voltage controlled oscillator, said second voltage controlled oscillator using said frequency reference and outputting a mixing signal, said mixing signal being mixed with said downlink signal.

17. A modem, comprising
a voltage controlled oscillator;
a voltage controlled crystal oscillator;
a frequency synthesizer coupled to said voltage controlled oscillator to produce a mixing signal, wherein said frequency synthesizer uses a frequency reference and wherein said frequency reference is provided by said voltage controlled crystal oscillator;
a mixer for mixing said mixing signal with a modulated signal to produce a mixed modulated signal; and
a detector for converting said mixed modulated signal into a composite signal,
wherein said composite signal is input into said voltage controlled crystal oscillator to create a feedback loop.

18. A modem according to claim 17, wherein said modulated signal is a frequency shift keyed signal and wherein said detector includes a quadrature detector.

19. A modem according to claim 18, wherein said frequency shift keyed signal is bipolar coded.

20. The modem of claim 17, wherein said composite signal comprises of at least a DC offset signal.

21. The modem of claim 17, wherein said composite signal comprises of at least an analogue data signal.

22. A system for transmitting data from a plurality of remote locations to a central location, comprising:
a central location modem for receiving a modulated signal; and
a plurality of remote location modems for converting an input data stream into said modulated signal, each said remote location modem comprising:
modulator circuitry for modulating an input data stream with a carrier signal to produce a first modulated signal, wherein said carrier signal is generated by an oscillator circuit;
an amplifier coupled to said modulator circuitry for amplifying said first modulated signal and outputting said modulated signal, wherein said amplifier outputs a monitor signal when said amplifier is outputting said modulated signal; and
a protection circuit coupled to said amplifier and to said oscillator circuit, said protection circuit including a timer having a duration, said timer being triggered by receipt of said monitor signal, wherein said protection circuit outputs first and second signals when said amplifier outputs said monitor signal for a time longer than said duration of said timer, said first signal disabling said amplifier and said second signal disabling said oscillator circuit.

23. A system according to claim 22, wherein said oscillator circuit comprises a frequency synthesizer coupled to a voltage controlled oscillator and a divide by two circuit coupled to said voltage controlled oscillator, wherein said voltage controlled oscillator outputs a second carrier signal and wherein said second carrier signal is input into said divide by two circuit and said carrier signal is output by said divide by two circuit.

24. A system according to claim 23, wherein said frequency synthesizer uses a frequency reference and wherein said frequency reference is provided by a voltage controlled crystal oscillator.

25. A system according to claim 24, said remote location modem further comprising a receiver, said receiver receiving a downlink signal, wherein said downlink signal is used in a feedback loop as an input into said voltage controlled crystal oscillator.

26. A system according to claim 24, said oscillator circuit further comprising a second frequency synthesizer coupled to a second voltage controlled oscillator, said second voltage controlled oscillator using said frequency reference and outputting a mixing signal, said mixing signal being mixed with said downlink signal.

27. A modem, comprising:
an oscillator circuit for producing a carrier signal,
said oscillator circuit, comprising
a frequency synthesizer coupled to
a voltage controlled oscillator, and
a divide by two circuit coupled to said voltage controlled oscillator,
wherein said voltage controlled oscillator outputs a second carrier signal and wherein said second carrier signal is input into said divide by two circuit and said carrier signal is output by said divide by two circuit;
modulator circuitry for modulating an input data stream with said carrier signal to produce a modulated signal;
a protection circuit to permit transmission for only a predetermined time coupled to said divide by two circuit; and
a receiver, said receiver receiving a downlink signal, wherein said downlink signal is used in a feedback loop as an input into a voltage controlled crystal oscillator.

* * * * *